United States Patent
Conner

(10) Patent No.: US 7,300,177 B2
(45) Date of Patent: Nov. 27, 2007

(54) ILLUMINATION SYSTEM HAVING A PLURALITY OF LIGHT SOURCE MODULES DISPOSED IN AN ARRAY WITH A NON-RADIALLY SYMMETRICAL APERTURE

(75) Inventor: Arlie R. Conner, Portland, OR (US)

(73) Assignee: 3M Innovative Properties, St. Paul, MN (US)

( * ) Notice: Subject to any disclaimer, the term of this patent is extended or adjusted under 35 U.S.C. 154(b) by 66 days.

(21) Appl. No.: 10/776,152

(22) Filed: Feb. 11, 2004

(65) Prior Publication Data

US 2005/0174768 A1    Aug. 11, 2005

(51) Int. Cl.
*F21V 5/00* (2006.01)
(52) U.S. Cl. .................................... 362/244
(58) Field of Classification Search ............. 362/11, 362/19, 227, 233, 235, 237, 244, 252, 253, 362/326, 330, 337, 338, 347, 800
See application file for complete search history.

(56) References Cited

U.S. PATENT DOCUMENTS

| | | |
|---|---|---|
| 1,428,662 A | 9/1922 | Walter |
| 1,451,893 A | 4/1923 | Walter |
| 1,900,966 A | 3/1933 | Wolfe |
| 1,932,817 A | 10/1933 | Gehrke |
| 2,587,956 A | 3/1952 | Roy |
| 3,756,688 A | 9/1973 | Hudson et al. |
| 3,984,178 A | 10/1976 | Bergqvist |
| 4,733,335 A | 3/1988 | Serizawa et al. |
| 4,767,172 A | 8/1988 | Nichols et al. |
| 4,852,980 A | 8/1989 | Shinichi |
| 4,915,489 A | 4/1990 | Minko |
| 4,941,072 A | 7/1990 | Yasumoto et al. |

(Continued)

FOREIGN PATENT DOCUMENTS

EP        0 083 527        7/1983

(Continued)

OTHER PUBLICATIONS

Laikin, Milton, "Lens Design—Third Edition, Revised and Expanded", Table of Contents, pp. 305-312, Marcel Dekker, New York, 2001.

(Continued)

*Primary Examiner*—Ali Alavi
*Assistant Examiner*—William J Carter
(74) *Attorney, Agent, or Firm*—Jay R. Pralle

(57) ABSTRACT

Illumination systems are disclosed, which include a plurality of light source modules, each having a light-emitting surface, and a system of optical elements configured to image the emitting surfaces onto an illumination target. The shape of the emitting surface or of the image of the emitting surface produced by the system of optical elements may substantially match the shape of the target. In addition, illumination systems are disclosed that utilize a plurality of source modules having light-emitting surfaces of different colors. Furthermore, the present disclosure is directed to illumination systems including a plurality of light source modules disposed in an array within a non-radially symmetrical aperture and to illumination systems in which the light source modules and the system of optical elements are configured to form a plurality of channels aimed substantially into the illumination target.

42 Claims, 8 Drawing Sheets

U.S. PATENT DOCUMENTS

| | | | |
|---|---|---|---|
| 5,001,609 A | 3/1991 | Gardner et al. | |
| 5,055,892 A | 10/1991 | Gardner et al. | |
| 5,285,318 A | 2/1994 | Gleckman | |
| 5,398,086 A * | 3/1995 | Nakano et al. | 353/31 |
| 5,428,365 A | 6/1995 | Harris | |
| 5,442,414 A | 8/1995 | Janssen | |
| 5,506,929 A | 4/1996 | Tai et al. | |
| 5,557,353 A * | 9/1996 | Stahl | 353/69 |
| 5,592,188 A | 1/1997 | Doherty | |
| 5,625,738 A | 4/1997 | Magarill | |
| 5,633,737 A | 5/1997 | Tanaka | |
| 5,662,401 A | 9/1997 | Shimizu | |
| 5,719,706 A | 2/1998 | Masumoto | |
| 5,757,341 A | 5/1998 | Clarke | |
| 5,764,319 A | 6/1998 | Nishihara | |
| 5,782,553 A | 7/1998 | McDermott | |
| 5,796,526 A | 8/1998 | Anderson | |
| 5,839,823 A | 11/1998 | Hou | |
| 5,863,125 A | 1/1999 | Doany | |
| 5,900,981 A | 5/1999 | Oren | |
| 5,900,982 A | 5/1999 | Dolgoff | |
| 5,902,033 A | 5/1999 | Levis et al. | |
| 5,969,872 A | 10/1999 | Oren | |
| 5,971,545 A | 10/1999 | Haitz | |
| 5,987,793 A | 11/1999 | Ebine | |
| 5,997,150 A * | 12/1999 | Anderson | 362/227 |
| 6,028,694 A | 2/2000 | Schmidt | |
| 6,038,005 A * | 3/2000 | Handschy et al. | 349/61 |
| 6,061,183 A | 5/2000 | Nakai | |
| 6,102,552 A * | 8/2000 | Tullis | 362/249 |
| 6,104,458 A | 8/2000 | Fukuda | |
| 6,104,541 A | 8/2000 | Otomo | |
| 6,139,156 A | 10/2000 | Okamori et al. | |
| 6,144,426 A | 11/2000 | Yamazaki | |
| 6,177,761 B1 | 1/2001 | Pelka | |
| 6,196,699 B1 | 3/2001 | Stanton | |
| 6,201,629 B1 * | 3/2001 | McClelland et al. | 359/223 |
| 6,224,216 B1 | 5/2001 | Parker | |
| 6,227,669 B1 | 5/2001 | Tiao | |
| 6,236,512 B1 | 5/2001 | Nakai | |
| 6,252,636 B1 | 6/2001 | Bartlett | |
| 6,254,237 B1 | 7/2001 | Booth | |
| 6,280,058 B1 * | 8/2001 | Horigome | 362/268 |
| 6,318,863 B1 | 11/2001 | Tiao | |
| 6,330,039 B2 | 12/2001 | Matsui | |
| 6,332,688 B1 | 12/2001 | Magarill | |
| 6,336,724 B1 | 1/2002 | Shoui et al. | |
| 6,341,867 B1 | 1/2002 | Itoh | |
| 6,398,389 B1 | 6/2002 | Bohler et al. | |
| 6,402,347 B1 | 6/2002 | Maas | |
| 6,412,953 B1 | 7/2002 | Tiao et al. | |
| 6,419,365 B1 | 7/2002 | Potekev et al. | |
| 6,459,835 B1 | 10/2002 | Nagaoka et al. | |
| 6,469,755 B1 | 10/2002 | Adachi | |
| 6,471,358 B1 | 10/2002 | Itoh et al. | |
| 6,478,453 B2 | 11/2002 | Lammers et al. | |
| 6,483,196 B1 | 11/2002 | Wojnarowski | |
| 6,491,443 B1 | 12/2002 | Serizawa et al. | |
| 6,499,863 B2 | 12/2002 | Dewald | |
| 6,505,939 B1 | 1/2003 | Bierhuizen et al. | |
| 6,527,419 B1 | 3/2003 | Galli | |
| 6,547,400 B1 | 4/2003 | Yokoyama | |
| 6,547,423 B2 | 4/2003 | Marshall | |
| 6,561,654 B2 | 5/2003 | Mukawa et al. | |
| 6,570,190 B2 | 5/2003 | Krames | |
| 6,591,037 B2 | 7/2003 | Yonekubo | |
| 6,595,648 B1 | 7/2003 | Woodgate et al. | |
| 6,623,122 B1 | 9/2003 | Yamazaki et al. | |
| 6,639,572 B1 * | 10/2003 | Little et al. | 345/55 |
| 6,644,814 B2 | 11/2003 | Ogawa | |
| 6,646,806 B1 | 11/2003 | Bierhuizen | |
| 6,657,236 B1 | 12/2003 | Thibeault | |
| 6,672,724 B1 | 1/2004 | Peterson et al. | |
| 6,688,747 B2 | 2/2004 | Wichner et al. | |
| 6,698,893 B2 | 3/2004 | Takimoto et al. | |
| 6,726,329 B2 | 4/2004 | Li et al. | |
| 6,733,139 B2 | 5/2004 | Childers et al. | |
| 6,788,471 B2 | 9/2004 | Wagner | |
| 6,834,963 B2 | 12/2004 | Kim et al. | |
| 6,843,566 B2 | 1/2005 | Mihara | |
| 2001/0022613 A1 | 9/2001 | Matsui | |
| 2001/0033367 A1 | 10/2001 | Karasawa et al. | |
| 2001/0046131 A1 | 11/2001 | Hoelen | |
| 2001/0048493 A1 | 12/2001 | Swanson | |
| 2001/0048560 A1 | 12/2001 | Sugano | |
| 2002/0003636 A1 * | 1/2002 | Conner | 359/15 |
| 2002/0003669 A1 | 1/2002 | Kedar et al. | |
| 2002/0030194 A1 | 3/2002 | Camras et al. | |
| 2002/0093743 A1 | 7/2002 | Miyamae | |
| 2002/0097000 A1 | 7/2002 | Muthu | |
| 2002/0105807 A1 | 8/2002 | Loughrey | |
| 2002/0114157 A1 | 8/2002 | Fu-Ming et al. | |
| 2002/0145708 A1 | 10/2002 | Childers et al. | |
| 2002/0154277 A1 | 10/2002 | Mukawa et al. | |
| 2002/0159036 A1 | 10/2002 | Yamagishi | |
| 2002/0186350 A1 | 12/2002 | Peterson | |
| 2002/0191395 A1 | 12/2002 | Fleury | |
| 2003/0016539 A1 | 1/2003 | Minano | |
| 2003/0043582 A1 * | 3/2003 | Chan et al. | 362/259 |
| 2003/0133080 A1 | 7/2003 | Ogawa | |
| 2003/0147055 A1 | 8/2003 | Yokoyama | |
| 2003/0193649 A1 | 10/2003 | Seki | |
| 2003/0214815 A1 | 11/2003 | Ishida et al. | |
| 2004/0004176 A1 | 1/2004 | Liang | |
| 2004/0042212 A1 | 3/2004 | Du et al. | |
| 2004/0062044 A1 | 4/2004 | Kazunari | |
| 2004/0062045 A1 | 4/2004 | Chang | |
| 2004/0080938 A1 | 4/2004 | Holman et al. | |
| 2004/0114250 A1 | 6/2004 | Kato | |
| 2004/0174501 A1 | 9/2004 | Slobodin et al. | |
| 2004/0202007 A1 | 10/2004 | Yagi et al. | |
| 2004/0207816 A1 | 10/2004 | Manabu et al. | |
| 2005/0018141 A1 | 1/2005 | Hosaka | |
| 2005/0023545 A1 | 2/2005 | Camras et al. | |
| 2005/0094401 A1 | 5/2005 | Magarill | |
| 2005/0134811 A1 | 6/2005 | Magarill | |
| 2005/0174658 A1 | 8/2005 | Long et al. | |
| 2005/0174768 A1 | 8/2005 | Conner | |
| 2005/0174771 A1 | 8/2005 | Conner | |
| 2005/0174775 A1 | 8/2005 | Conner | |
| 2005/0179041 A1 | 8/2005 | Harbers et al. | |

FOREIGN PATENT DOCUMENTS

| | | |
|---|---|---|
| EP | 0 322 070 | 6/1989 |
| EP | 0 493 800 | 7/1992 |
| EP | 0 587 371 | 3/1994 |
| EP | 0 740 178 | 10/1996 |
| EP | 0 795 771 | 9/1997 |
| EP | 0 837 350 | 4/1998 |
| EP | 0 881 514 | 12/1998 |
| EP | 1 003 064 | 5/2000 |
| EP | 1 052 856 | 11/2000 |
| EP | 1 347 653 | 9/2003 |
| EP | 1 357 333 A | 10/2003 |
| EP | 1 363 460 | 11/2003 |
| EP | 1 398 659 | 3/2004 |
| GB | 1 195 547 A | 6/1970 |
| JP | 09-018072 | 1/1997 |
| JP | 10123512 | 5/1998 |
| JP | 11-231316 | 8/1999 |
| JP | 2000-305040 | 11/2000 |
| JP | 2002-133932 | 5/2002 |
| JP | 2002-177218 A | 6/2002 |

| | | |
|---|---|---|
| JP | 2002-184206 | 6/2002 |
| JP | 2003-330109 | 11/2003 |
| JP | 2005-128236 | 5/2005 |
| TW | 531 662 B | 5/2003 |
| WO | WO 02/48775 A | 6/2002 |
| WO | WO 02/065184 | 8/2002 |
| WO | WO 03/056876 | 7/2003 |
| WO | WO 2004/043076 | 5/2004 |
| WO | WO 2004-107751 | 12/2004 |
| WO | WO 2004/109366 | 12/2004 |
| WO | WO 2005/078496 | 8/2005 |

OTHER PUBLICATIONS

Melles Griot: "Specifying Laser Diode Optics" Online! 2000, 2002 XP002323875, Section "Focusing Lenses For Fiber Optics" Lines 19-23, Figures 3, 4.

Jacobson, et al., "Novel Compact Non-Imaging Collectors for LED Arrays", Illumitech, Inc., bjacobson@illumitech.com.

Lumileds Lighting, U.S., LLC, "Power Light Source Luxeon™ Emitter", Document # DW25 (Jul. 25, 2003) pp. 1-12.

Smith, Warren J. "Modern Optical Engineering The Design of Optical Systems", McGraw-Hill Third Edition, (2000) pp. 245-247, 470-474.

Stupp, Edward H. and Brennesholtz, Matthew S. "Projection Displays" Modeling Lumen Throughput "Etendue at a flat surface" John Wiley & Sons, Inc. III Series (1999) p. 244-245.

Light Emitting Diodes 2003, Oct. 15-17, 2002, "Optical Design for LED Based Devices" Juan Manuel Teijido, Sony International (Europe) GmbH, Sony Corporate Laboratories Europe.

U.S. Appl. No. 10/727,220, filed Dec. 2, 2003, Schultz.

U.S. Appl. No. 10/748,653, filed Dec. 30, 2003, Cannon.

U.S. Appl. No. 10/726,225, filed Dec. 2, 2003, Henson.

U.S. Appl. No. 10/726,222, filed Dec. 2, 2003, Henson.

U.S. Appl. No. 10/776,390, filed Feb. 11, 2004, Conner.

U.S. Appl. No. 10/776,155, filed Feb. 11, 2004, Conner.

Secondary Optics Design Considerations for SuperFlux LEDs, application brief AB20-5, Appendix 5A, pp. 5-22.

Steve Paolini, Gerard Harbers, Matthijs Keuper, Lumileds, Light from Silicon Valley, High-Power LED Illuminators in Projection Displays, pp. 1-19.

Gerard Harbers, Wim Timmers, Willem Sillevis-Smitt, LED Backlighting for LCD HDTV, Journal of the SID, Oct. 4, 2002, pp. 347-350.

Steve Paolini, Gerard Harbers, Matthijs Keuper, Lumileds, Light from Silicon Valley, Performance of High-Power LED Illuminators in Projection Displays.

LumiBright Light Engine, Innovations in Optics, Inc, Woburn, Massachusetts.

* cited by examiner

ILLUMINATION SYSTEM HAVING A PLURALITY OF LIGHT SOURCE MODULES DISPOSED IN AN ARRAY WITH A NON-RADIALLY SYMMETRICAL APERTURE

FIELD OF THE INVENTION

The present disclosure relates to illumination systems, which may be used, for example, in projection and backlighting systems. More specifically, the disclosure relates to illumination systems that include a plurality of light source modules and a system of optical elements.

BACKGROUND

Illumination systems have a variety of applications, including projection displays, backlights for liquid crystal displays (LCDs) and others. Projection systems usually include a source of light, illumination optics, an image-forming device, projection optics and a projection screen. The illumination optics collect light from a light source and direct it to one or more image-forming devices in a predetermined manner. The image-forming device(s), controlled by an electronically conditioned and processed digital video signal, produces an image corresponding to the video signal. Projection optics then magnify the image and project it onto the projection screen. White light sources, such as arc lamps, in conjunction with color wheels have been and still are predominantly used as light sources for projection display systems. However, recently, light emitting diodes (LEDs) were introduced as an alternative. Some advantages of LED light sources include longer lifetime, higher efficiency and superior thermal characteristics.

One example of an image-forming device frequently used in digital light processing systems is a digital micro-mirror device (DMD). The main feature of a DMD is an array of rotatable micro-mirrors. The tilt of each mirror is independently controlled by the data loaded into the memory cell associated with each mirror, to steer reflected light and spatially map a pixel of video data to a pixel on a projection screen. Light reflected by a mirror in an ON state passes through the projection optics and is projected onto the screen to create a bright field. On the other hand, light reflected by a mirror in an OFF state misses the projection optics, which results in a dark field. A color image also may be produced using a DMD, e.g., utilizing color sequencing, or, alternatively, using three DMDs, one for each primary color.

Other examples of image-forming devices include liquid crystal panels, such as a liquid crystal on silicon device (LCOS). In liquid crystal panels, the alignment of the liquid crystal material is controlled incrementally (pixel-to-pixel) according to the data corresponding to a video signal. Depending on the alignment of the liquid crystal material, polarization of the incident light may be altered by the liquid crystal structure. Thus, with appropriate use of polarizers or polarizing beam splitters, dark and light regions may be created, which correspond to the input video data. Color images have been formed using liquid crystal panels in the manner similar to the DMDs.

LCD backlights traditionally have included one or more light sources, such as cold cathode fluorescent lamps (CCFLs). Typical direct-lit backlights usually include an array of sources or a single extended source placed behind an LCD. Light generated by the backlight is usually diffused for increased uniformity and directed to an array of red, green and blue filters corresponding to the red, green and blue pixels of the LCD, if a color image is desired. The red, green and blue pixels modulate the transmitted red, green and blue components according to the input image data.

Performance of optical systems, such as projection and backlighting systems, may be characterized by a number of parameters, one of them being etendue. The etendue, $\epsilon$, may be calculated using the following formula:

$$\epsilon = A * \Omega \approx \pi * A * \sin^2\theta = \pi * A * NA^2$$

where $\Omega$ is the solid angle of emission or acceptance (in steradians); A is the area of the receiver or emitter, $\theta$ is the emission or acceptance angle, and NA is the numerical aperture. If the etendue of a certain element of an optical system is less than the etendue of an upstream optical element, the mismatch may result in loss of light, which reduces the efficiency of the optical system. Thus, performance of an optical system is usually limited by the element that has the smallest etendue. Techniques typically employed to decrease etendue degradation in an optical system include increasing the efficacy of the system (lm/w), decreasing the source size, decreasing the beam solid angle, and avoiding the introduction of additional aperture stops.

Traditional optics used in illumination systems have included various configurations, but their off-axis performance has been satisfactory only within narrowly tailored ranges. This and other shortcomings prompted complicated designs of optical elements and systems, which involved, e.g., utilization of complicated aspheric surfaces and complex combinations of numerous elements. In addition, optics in traditional illumination systems have exhibited insufficient collection characteristics. In particular, if a significant portion of a light source's output emerges at angles that are far from the optical axis, which is the case for most LEDs, conventional illumination systems fail to capture a substantial portion of such light.

Further, traditional illumination systems usually have relatively poor imaging characteristics, for example due to aberrations. In particular, that is the case for most traditional reflectors and/or collectors used in projection and backlighting applications for combining several light sources of different wavelengths. In addition, although some traditional reflective collimators have acceptable collection characteristics, for example, elliptical and parabolic reflectors, such reflectors are usually characterized by rotationally symmetric bias. Such a bias generally results in the rounding of the resultant image as well as in lack of overall correspondence between a point on the light source and a point on the target plane, thus causing loss of order and degradation of etendue.

SUMMARY

The present disclosure is directed to illumination systems including light source modules having light-emitting surfaces, an illumination target and a system of optical elements disposed between the light source modules and the illumination target. In some exemplary embodiments, the system of optical elements images the emitting surfaces of the light source modules onto the illumination target. The shape of at least one of the emitting surfaces may substantially match the shape of the illumination target, which may be, for example, a generally square entrance of a light tunnel or a generally rectangular image-forming device.

In other exemplary embodiments, the shape of an emitting surface may be substantially square, the shape of the illumination target may be substantially rectangular, and the system of optical elements may be configured so that the shape of the illumination patch substantially matches the shape of the illumination target. In some exemplary embodiments of the present disclosure, substantially superimposed images of the emitting surfaces form an illumination patch substantially filling or overfilling the illumination target. Alternatively, images of the emitting surfaces may be closely packed to form an illumination patch, or the images of the emitting surfaces may overlap to forming an illumination patch.

The present disclosure is also directed to illumination systems including light source modules, each having emitting surfaces of different colors disposed next to each other, an illumination target and a system of optical elements disposed between the light source modules and the illumination target. In some exemplary embodiments, the system of optical elements images the emitting surfaces onto the illumination target. In the appropriate embodiments, each light source module includes a first light-emitting surface of a first color, a second light-emitting surface of a second color and a third light-emitting surface of a third color. In such embodiments, the illumination target may include first, second and third color zones, and the system of optical elements may image the first emitting surface onto the first color zone, the second emitting surface onto the second color zone, and the third emitting surface onto the third color zone. The first, second and third colors may be primary colors. Optionally, the system of optical elements may include other elements, such as a lenticular array and dichroic mirrors.

The present disclosure is also directed to illumination systems in which light source modules are disposed in an array within a non-radially symmetrical aperture. The illumination systems also include illumination targets, such as an image-forming device having a plurality of mirrors rotatable about a pivot axis. In the latter case, the non-radially symmetrical aperture has a long dimension and a short dimension and is oriented so that the long dimension is aligned with the pivot axis of the mirrors of the image-forming device.

In addition, the present disclosure is directed to illumination systems including a plurality of light source modules having light-emitting surfaces, an illumination target and a system of optical elements disposed between the plurality of light source modules and the illumination target. The light source modules and the system of optical elements are configured to form a plurality of channels aimed substantially into the illumination target. The light source modules can be disposed tangentially to and along a spherical surface. Alternatively, the light source modules can be disposed substantially coplanar with each other, while the system of optical elements can be used for aiming at least some light from each light source module substantially toward the illumination target.

These and other aspects of the illumination systems of the subject invention will become readily apparent to those of ordinary skill in the art from the following detailed description together with the drawings.

BRIEF DESCRIPTION OF THE DRAWINGS

So that those of ordinary skill in the art to which the subject invention pertains will more readily understand how to make and use the subject invention, exemplary embodiments thereof will be described in detail below with reference to the drawings, wherein.

DETAILED DESCRIPTION

Figure 1:
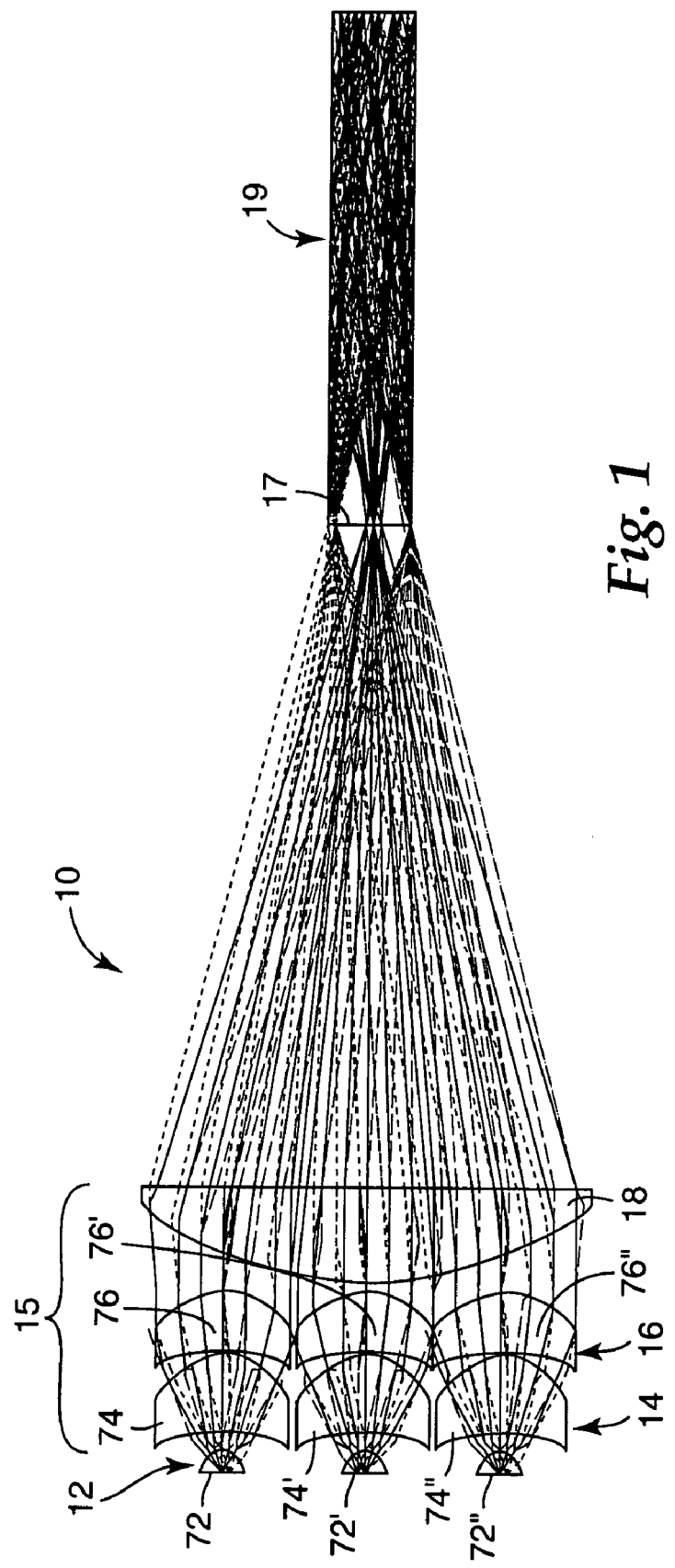
FIG. 1 is a schematic cross-sectional view of an illumination system constructed according to an exemplary embodiment of the present disclosure.

Referring now to the drawings, wherein like reference numbers designate similar elements, FIG. 1 shows schematically an exemplary embodiment of the illumination systems of the present disclosure, which may be used for projection applications. The illumination system 10 shown in FIG. 1 includes a set of light source modules 12, illustrated by the light source modules 72, 72', 72", and a system of optical elements 15. One or more light source modules may include an LED light source, such as presently commercially available LED light sources. Those of ordinary skill in the art will appreciate that as LEDs with increased efficiency and output are developed and perfected, such LEDs will be advantageously used in exemplary embodiments of the present disclosure, since LEDs with high maximum output are usually preferred. Alternatively, organic light emitting diodes (OLED), vertical cavity surface emitting lasers (VCSEL) or other suitable light emitting devices may be used.

The set of light source modules 12 may be configured as an array, and the light source modules, such as 72, 72', 72", may be mounted on one or more substrates, together or individually, so that the heat generated by the light source modules may be readily dissipated by the material of the substrate(s). Examples of substrates suitable for mounting the light source modules include printed circuit boards, such as metal-core printed circuit boards, flexible circuits, such as polyimide film with copper traces, ceramic substrates, and others. Those of ordinary skill in the art will appreciate that many configurations of the set of light source modules 12 and of the individual light source modules, such as 72, 72', 72", are within the scope of the present disclosure. In addition, the number and type of light source modules may vary depending on the application, desired system configuration, dimensions of the system, and the system's output brightness.

In the exemplary embodiments illustrated in FIG. 1, the system of optical elements 15 includes a first set of lenses 14, including lenslets 74, 74', 74", a second set of lenses 16, including lenslets 76, 76', 76", and a condenser 18. Similar to the number of light source modules, the numbers of lenslets in the sets 14 and 16 may vary depending on the application, desired system configuration and the desired dimensions of the system. The condenser 18 may be or may include a plano-convex lens. Alternatively, the condenser may be or may include a meniscus lens in order to reduce aberrations, or any other type of lens or lenses depending on the desired characteristics of the output light. The system of optical elements 15 may include other components in addition to or in place of the condenser 18, as may be useful for a particular application, for example it may include dichroic mirrors for separating or combining light beams of different colors. Further, in some exemplary embodiments, such as embodiments illustrated in FIGS. 4A-4D and discussed below, the condenser 18 may be omitted from the system.

In the appropriate embodiments of the present disclosure, each light source module has an optical element or elements associated with it in order to facilitate collection of light and to achieve the desired imaging characteristics. For example, in the exemplary embodiment illustrated in FIG. 1, a pair of lenslets (one from the set 14 and one from the set 16) is associated with each light source module from the set 12. In particular, FIG. 1 shows lenslets 74 and 76 associated with the light source module 72, lenslets 74' and 76' associated with the light source module 72', and lenslets 74" and 76" associated with the light source module 72". The sets of lenses 14 and 16 may be configured as a double-layered hexagonal closely packed array, such as an array shown in FIG. 2B or another suitable configuration, with the configuration of the set of light source modules 12 substantially tracking the configuration of the sets of lenses 14 and 16.

Figure 2A:
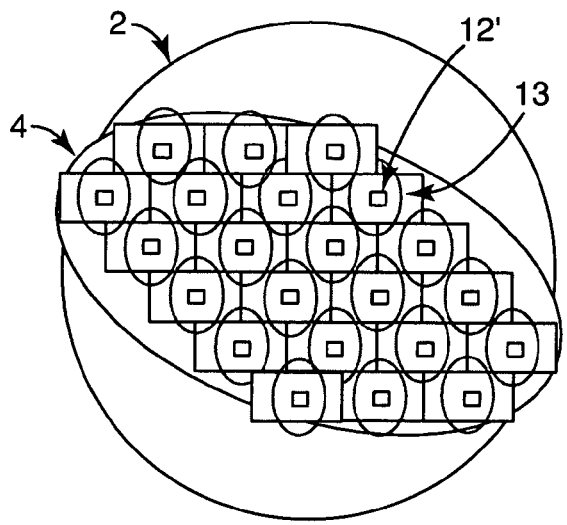
FIG. 2A is a schematic front view of an array of light source modules with associated optical elements, arranged substantially to approximate the shape of an asymmetric contrast-enhancing aperture.

An exemplary configuration of the set of light source modules is also illustrated in FIG. 2A, which shows a theoretical circular entrance pupil 2 of an illumination system and a non-radially symmetrical entrance pupil 4 formed by appropriately positioning the set of light source modules 12'. This and similar configurations are particularly advantageous in projection systems utilizing one or more DMDs illuminated at an angle and without a light tunnel (described below) being interposed between the light source and the image-forming device. Generally, in such systems there is a strong dependence between the angle of illumination and the amount of light scattered into a projection pupil by reflection from the mirror frame and from beneath the mirrors in OFF states. Increasing illumination angle increases contrast, but it also causes an offset of the illumination pupil with respect to the projection pupil, introducing vignetting, if the numerical aperture of the projection optics is not increased accordingly. However, if the projection optics' aperture is increased to avoid vignetting, it can collect more flat state (neither ON nor OFF) reflections and stray light from around the DMD and pass it to the screen, thus potentially defeating the initial intent of improving contrast.

In the traditional illumination systems utilizing arc lamps, this problem was addressed by placing a truncating aperture stop in the illumination pupil to block at least a portion of the flat state reflections that overlap with the ON state reflections. However, recently, it has been shown that the contrast of DMD projection systems can be enhanced with asymmetric apertures. U.S. Pat. No. 5,442,414, the disclosure of which is hereby incorporated by reference herein to the extent it is not inconsistent with the present disclosure, describes contrast-enhancing asymmetric apertures, having long and short dimensions, with the long dimension being aligned with the pivot axis of the mirrors.

Thus, in the appropriate exemplary embodiments of the present disclosure, the configuration of the set of the light source modules 12' may be selected so that the individual light source modules are disposed within the area of the pupil that has the highest contrast, illustrated as the non-radially symmetrical aperture 4, thereby conserving illumination energy and reducing the number of the light source modules used. The configuration of the set of optical elements 13, associated with the light source modules, may be selected accordingly, and preferably will track the configuration of the set of the light source modules 12', so that the latter also would have the overall shape substantially approximating a non-radially symmetrical aperture, as illustrated in FIG. 2A.

Other configurations of the sets of light source modules and the sets of optical elements, for example sets of lenses 14 and 16 shown in FIG. 1, are also within the scope of the present disclosure, such as arrays having generally rectangular or square shape, depending on the specific application and other considerations, such as the shape and size of the illumination target, as well as cost. Further, only one set of lenses 14 or 16 may be used without departing from the scope of the present disclosure.

Figure 2B:
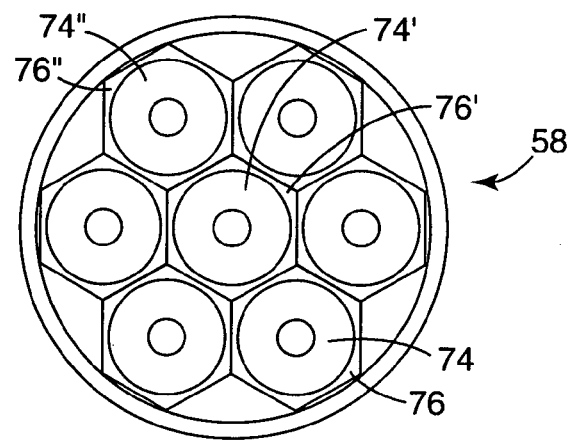
FIG. 2B is an enlarged front view of a hexagonal closely packed array of lenses, which may be included in appropriate exemplary embodiments of the present disclosure.

FIG. 2B represents a front view of an exemplary configuration 58 of the sets of lenses 14 and 16. In the configuration 58, lenslets of the set of lenses 14, such as 74, 74', 74", may be substantially the same shape and size, for example, having a substantially round outside diameter of about 18#mm. Lenslets of the set of lenses 16, such as lenslets 76, 76', 76", also may have substantially the same shape and size, for example, a substantially hexagonal shape with the shorter diagonal of about 20 mm and the longer diagonal of about 23 mm. The outer dimensions of the lenslets from the set 14 should be sufficiently large to collect a desired amount of light from the set of light source modules 12 and the outer dimensions of the lenslets from the set 16 should be sufficiently large to capture a desired amount of light exiting the set 14. In some exemplary embodiments, the individual lenslets in the sets 14 and 16 may have the same general shape and configuration, except for the edge details, since the second array preferably should be tooled to minimize interstitial areas.

Figure 3:
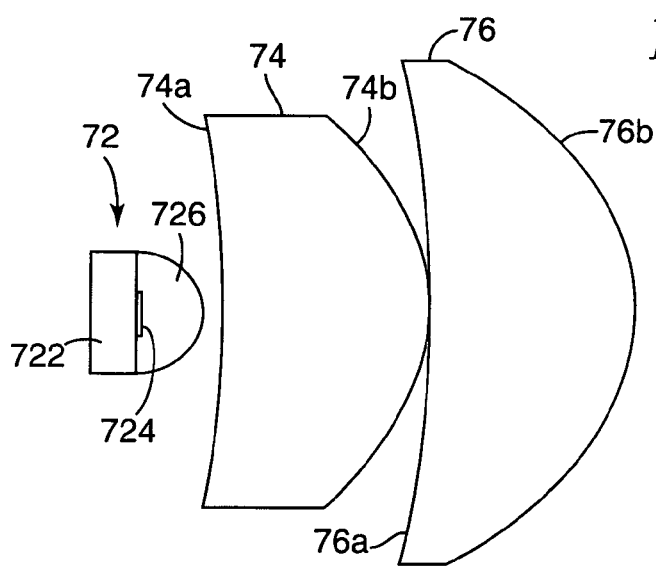
FIG. 3 is an enlarged cross-sectional view of a portion of an illumination system constructed according to an exemplary embodiment of the present disclosure, showing a light source module and associated lenslets.

The lenslets of the sets 14 and 16, such as lenslets 74, 74', 74" and 76, 76', 76", preferably are meniscus lenses configured substantially as the lenslets 74 and 76 shown in FIG. 3. FIG. 3 also shows a light source module 72, which in this exemplary embodiment includes a base 722, an emitting surface 724 and a substantially optically clear dome 726. Commercially available LED light source modules may be used in the appropriate embodiments of the present disclosure, which would make such illumination systems relatively inexpensive, compact and convenient to use. The emitting surface 724 may be or may include an emitting surface or surfaces of an LED, a layer of phosphor, or any other emissive material. Those of ordinary skill in the art will understand that the term "emitting surface" may be used to refer to any light-emitting surface of a light source module, such as any surface portion of a light-emitting semiconductor layer or chip encapsulated into substantially optically clear material.

As one example, dimensions of the lenslets 74 and 76 include a center thickness of about 8.8 mm, about −55 mm radius of the concave surfaces, and aspheric convex surface (described by the general aspheric equation) with the radius of about −10 mm and with a conic constant of about −0.55. The convex surface is made aspheric in order to reduce aberrations and to avoid the resulting loss of light. Optionally, the concave surface may be made aspheric as well. However, the performance of such lenses is more strongly influenced by the shape of the convex surface. Nonetheless, those of ordinary skill in the art will readily appreciate that the overall shape and size of the lenslets may vary depending on the specific application, configuration of the system and the system's size. The material of the lenses is preferably acrylic, but polycarbonate, polystyrene, glass or any other suitable material may be used as well. In general, materials with higher indexes of refraction are preferred, but ultimately the choice will be made depending on the factors important for a particular application, such as cost, moldability, ease of refractive index matching with optical glues or epoxies, etc.

In the appropriate embodiments of the present disclosure, the lenslet 74, having a concave side 74*a* and a convex side 74*b*, is disposed before the light source module 72, so that the concave side 74*a* generally faces the emitting surface 724. The lenslet 76, having a concave side 76*a* and a convex side 76*b*, is disposed so that the concave side 76*a* is adjacent to the convex side 74*b*. Preferably, the concave side 76*a* of the lenslet 76 is in direct contact with the convex side 74*b* of the lenslet 74 in order to maximize light collection efficiency, but in some embodiments the lenslets may be separated by a distance of up to about 4 mm and still have acceptable light collection characteristics. Larger spacings are also within the present disclosure, but such configurations are likely to have decreased collection efficiency if the spacing is increased without also increasing the outer dimensions of the lenslet 76. It will be understood by those of ordinary skill in the art that placing the lenslets 74 and 76 closer together and increasing the diameter of the lenslet 76 will usually allow collection of light within a wider range of angles and vise versa. The lenslets may be held together by a suitable optical glue or epoxy that is substantially index matched to the material of the lenslets.

Referring further to FIGS. 1 and 3, in some exemplary embodiments of the present disclosure, the system of optical elements 15 images one or more of the emitting surfaces of the light source modules, for example, the emitting surface 724 of the light source module 72, onto an illumination target 17. The nature of the illumination target 17 will vary depending on the specific application. For example, in FIG. 1, the illumination target 17 is shown, for illustrative purposes only, to be an entrance to a light tunnel 19.

Light tunnels suitable for use with the appropriate exemplary embodiments of the present disclosure are described, for example, in U.S. Pat. Nos. 5,625,738 and 6,332,688, the disclosures of which are hereby incorporated by reference herein to the extent they are not inconsistent with the present disclosure. A light tunnel would serve to homogenize the output of the light emitting modules, such as 72, 72', 72", and thus precise imaging of the emitting surfaces would not be needed in the exemplary embodiments utilizing light tunnels. The light tunnel 19 may be a mirror tunnel, e.g., a rectangular tunnel, solid or hollow, or an elongated tunnel composed of a solid glass rod that relies on total internal reflection to transfer light through it. Those of ordinary skill in the art will appreciate that numerous shape combinations for the input and output ends of the light tunnels are possible.

In other exemplary embodiments, the illumination target 17 may be an image-forming device, e.g., a DMD, a liquid crystal panel or one or more pixels or color zones of a liquid crystal display. In such embodiments, more precise imaging may be desired. In addition, such embodiments, if used in projection systems utilizing one or more DMDs, would benefit from arranging the light source modules to approximate substantially the shape of the contrast-enhancing asymmetric aperture, illustrated in FIG. 2A.

The emitting surfaces of the light source modules, such as those of the light source modules 72, 72', 72", can be given a specific shape to improve the performance of the illumination system 10. For example, one or more of the emitting surfaces may be shaped to match substantially the shape of the target 17. In particular, if the target 17 is a square entrance to a light tunnel 19, one or more of the emitting surfaces of the light source modules may also be generally shaped as squares. If, on the other hand, the target 17 is a rectangular image-forming device having an aspect ratio of about 16:9 (which is usually the case in high definition televisions), one or more of the emitting surfaces of the light source modules may also be generally shaped as rectangles, preferably with about the same aspect ratios. Alternatively, images of generally square emitting surfaces may be closely packed to substantially fill a rectangular illumination target. It will be readily appreciated by those of ordinary skill in the art that other general shapes of the emitting surfaces and of the illumination targets are within the scope of the present disclosure.

Referring further to FIG. 1, the system of optical elements 15 may be designed and configured to appropriately magnify the images of the emitting surfaces. Performance of a typical projection display usually would benefit from, or in some cases even require, a certain amount of overfill of the illumination target by the illumination patch, which in these exemplary embodiments would be formed by the superimposed images of one or more emitting surfaces of the light emitting modules. For example, for an imaging device of about 20.0×12.0 mm, the illumination patch may be about 10% larger in each axis, or about 22.0×13.2 mm. In some exemplary embodiments, it is desirable to make the amount of overfill substantially the same on all sides, for example, to accommodate mechanical misalignments. In such cases, one or more of the emitting surfaces of the light surface modules may be made slightly different in aspect ratio from the illumination target, in order to produce an image of the desired shape. Alternatively, the system of optical elements may include cylindrical lenses or other non-circularly symmetric optics that could convert the image(s) of the emitting surface(s) to a desired general shape or aspect ratio. Also, when desired, images of emitting surfaces of different colors, such as red, green and blue, or other primary colors, may be combined or superimposed with dichroic combining mirrors as shown and explained below.

Another group of exemplary embodiments of the illumination systems of the present disclosure is illustrated in FIGS. 4A-4D. In such exemplary embodiments, the configurations of the systems of optical elements are such that the condenser 18 used in the embodiments illustrated in FIG. 1 may be omitted. Instead, the embodiments shown in FIGS. 4A-4D utilize one or more individually focusing and aimed-in channels, which include one or more optical elements associated with each light source module, such as one or more lenses, which direct and focus at least a portion of the emission of one or more light source modules onto an illumination target, preferably so that they are superimposed on the illumination target to form an illumination patch.

Figure 4A:
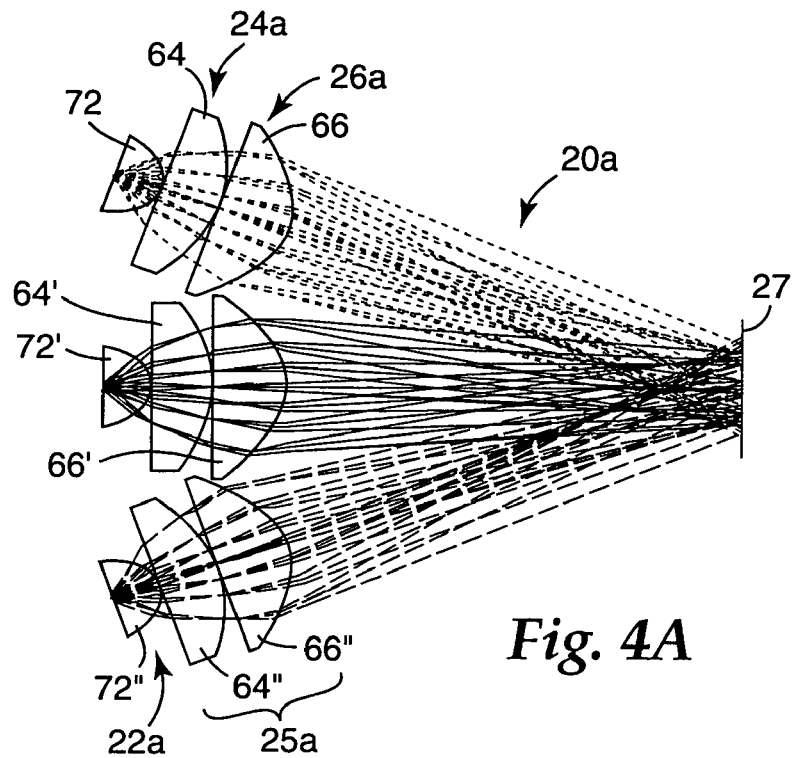
FIGS. 4A-4D are schematic cross-sectional views of another type of illumination systems constructed according to exemplary embodiments of the present disclosure, having individually focusing and aimed-in channels.
Figure 4B:
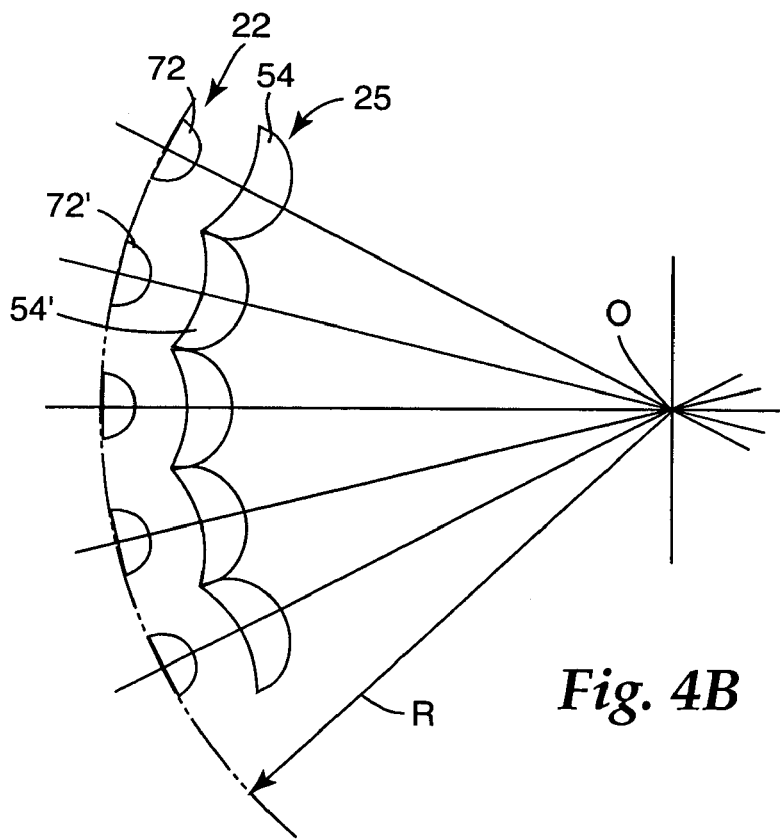

For example, FIG. 4A is a schematic representation of an exemplary illumination system 20*a* including a set of light source modules 22*a*, such as light source modules 72, 72', 72", and a system of optical elements 25*a*. The set of light source modules 22*a* is configured so that at least a portion of the emission of each light source module is aimed substantially toward the illumination target 27. This may be accomplished, for example, as shown in FIG. 4B, by arranging a set of light source modules 22, such as 72, 72', 72", tangentially to and along a spherical surface having a radius R and centered at O.

In the exemplary embodiments illustrated in FIG. 4A, the system of optical elements 25*a* includes a first set of lenses 24*a*, including lenslets 64, 64', 64", and a second set of lenses 26*a*, including lenslets 66, 66', 66". In this exemplary embodiment, lenslets in the set 24*a* are preferably plano-convex lenses having spherical surfaces pointing generally away from the light source modules, and lenslets in the set 26*a* are preferably plano-convex lenses having aspherical surfaces pointing away from the light source modules. Each aimed-in channel is formed by a light source module with the associated lenses or lens. For example, light source module 72 with the associated lenses 64 and 66 forms one such aimed-in channel. In the exemplary illumination system shown in FIG. 4B, the system of optical elements 25 utilizes one layer of meniscus lenses, such as 54, 54', 54" with the concave surfaces facing the light source modules. In that exemplary embodiment, a light source module and the associated meniscus lens, for example the light source module 72 and the lens 54, form each aimed-in channel.

Figure 4C:
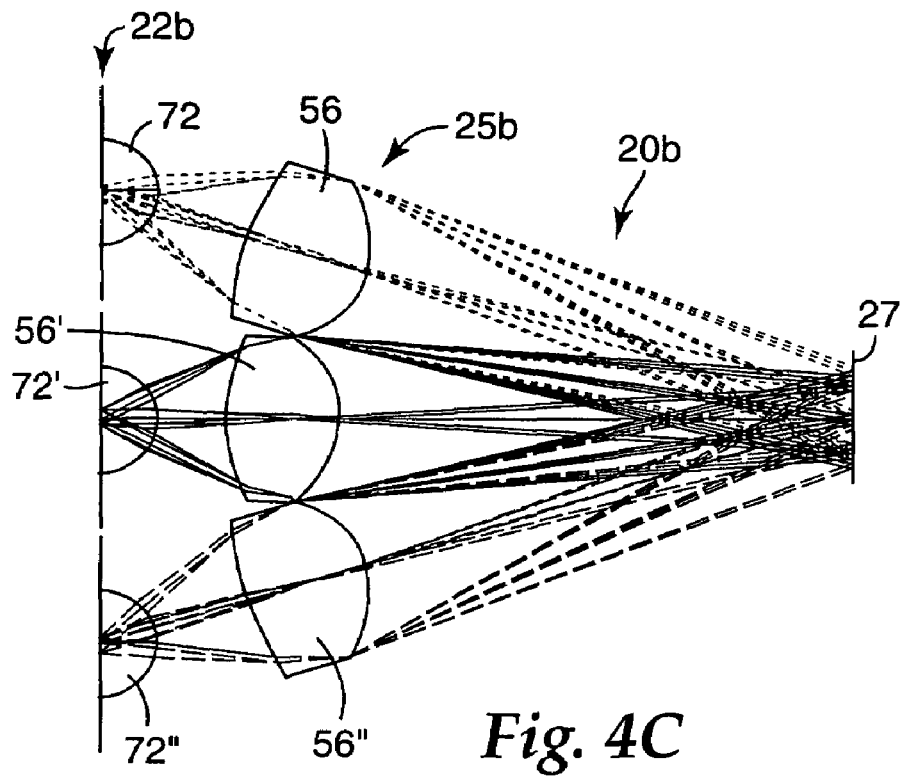

FIG. 4C is a schematic representation of an exemplary illumination system 20*b*, which includes a set of light source modules 22*b*, such as light source modules 72, 72', 72", and a system of optical elements 25*b*. The set of light source modules 22*b* is configured so that the light source modules are disposed substantially coplanar with each other for simplicity of wiring and assembly. As one example, this embodiment utilizes a hexagonally shaped array of seven light source modules. The emission of each light source module is aimed generally toward the illumination target 27 by appropriately configuring the system of optical elements 25*b*, which in this exemplary embodiment includes biconvex lenses, such as 56, 56' and 56". The aiming-in of individual channels may be accomplished, for example, by selecting the central optical element or elements, for example lens 56', to have a focal length that is shorter than those of the surrounding lenses, so that at least some of the output of the light source module 72', focused by the lens 56', could be superimposed on the illumination target with at least some of the output of the light source modules 72 and 72", focused by the lenses 56 and 56".

Figure 4D:
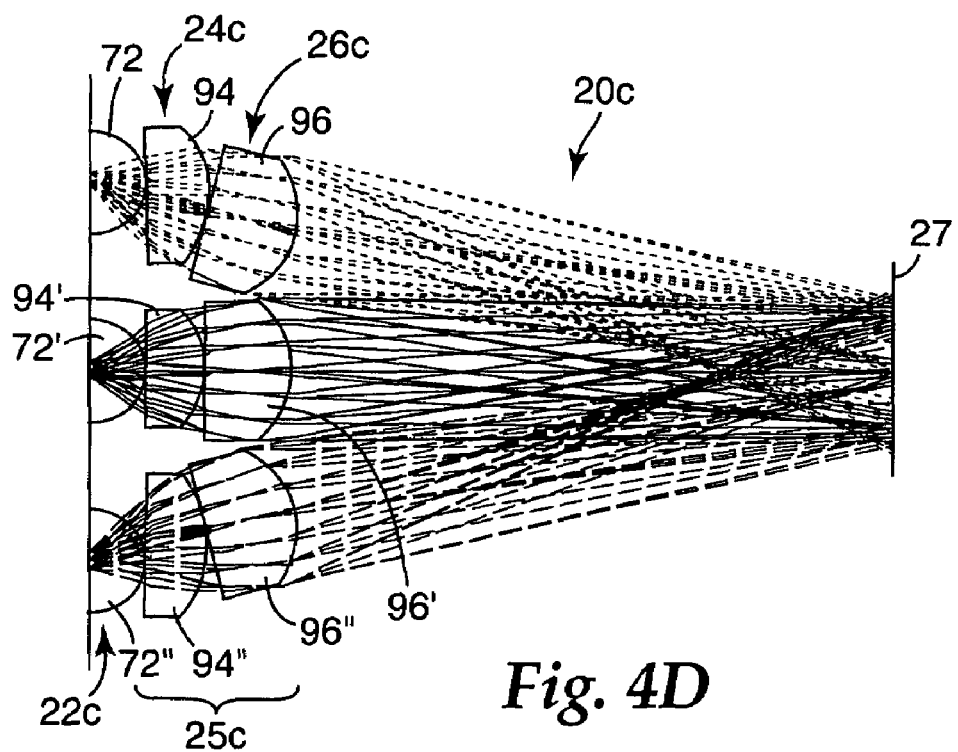

FIG. 4D is a schematic representation of an exemplary illumination system 20*c*, which includes a set of light source modules 22*c*, such as light source modules 72, 72', 72", and a system of optical elements 25*c*. The set of light source modules 22*c* is also configured so that the light source modules are disposed substantially coplanar with each other for simplicity of wiring and assembly. The emission of each light source module is aimed generally toward the illumination target 27 by appropriately configuring the system of optical elements 25*c*. In this exemplary embodiment, the system of optical elements 25*c* includes a first set of lenses 24*c*, including lenslets 94, 94', 94", and a second set of lenses 26*c*, including lenses 96, 96', 96". Lenses of the set 24*c* are disposed substantially coplanar with each other, while some of the lenses of the set 26*c* are tilted with respect to the optical axis of the system, for example, as shown for lenses 96 and 96" in FIG. 4D, to achieve superposition of the emission from the different light source modules on the illumination target 27.

Referring further to FIGS. 4A-4D, in some exemplary embodiments of the present disclosure, the systems of optical elements may be configured to image one or more of the emitting surfaces of the light source modules onto the illumination target 27. As explained above, the nature of the illumination target 27 will vary depending on the specific application. Those of ordinary skill in the art will also readily appreciate that the number and type of light source modules and of the optical elements associated with the light source modules, thus forming individual aimed-in channels, may also vary depending on the application, desired system configuration and the dimensions of the system.

The exemplary embodiments of the present disclosure, wherein light from one or more of the light source modules is focused onto the same illumination target by aiming the individual channels into the target can use fewer parts, can have lower cost, can be more efficient, and in some embodiments can result in brighter output than typical embodiments utilizing shared condensers. However, exemplary embodiments utilizing condensers can allow more flexibility, since a condenser may be used to adjust the angle of the output bundle of light, the back focal distance and the magnification. Further, in the exemplary embodiments illustrated in FIGS. 4A and 4B, the light source modules are not co-planar, which is a disadvantage for printed circuit board mounting. On the other hand, if the light source modules are mounted on the same substrate, such as the same printed circuit board, the associated optical elements disposed around the system's periphery would be aimed in or tilted, which could result in decreased luminance as compared, for example, to the system in which the light source modules point toward the center of a sphere and are mounted tangentially to it.

Each of the exemplary embodiments described herein may be particularly advantageous for a specific application. For example, higher collection efficiency is likely to be achieved when the optical element disposed in front of a light source module has a concave surface that "wraps around" the front portion of the light source module thus collecting light from larger angles. A flat surface facing a light source module will also work to achieve comparable collection efficiency, but such optical elements are harder to mold. The illumination system performance is also usually slightly improved by increasing the number of light source modules, as well as by the use of the "aimed-in" configuration as compared to the exemplary embodiments utilizing shared condensers.

Figure 5:
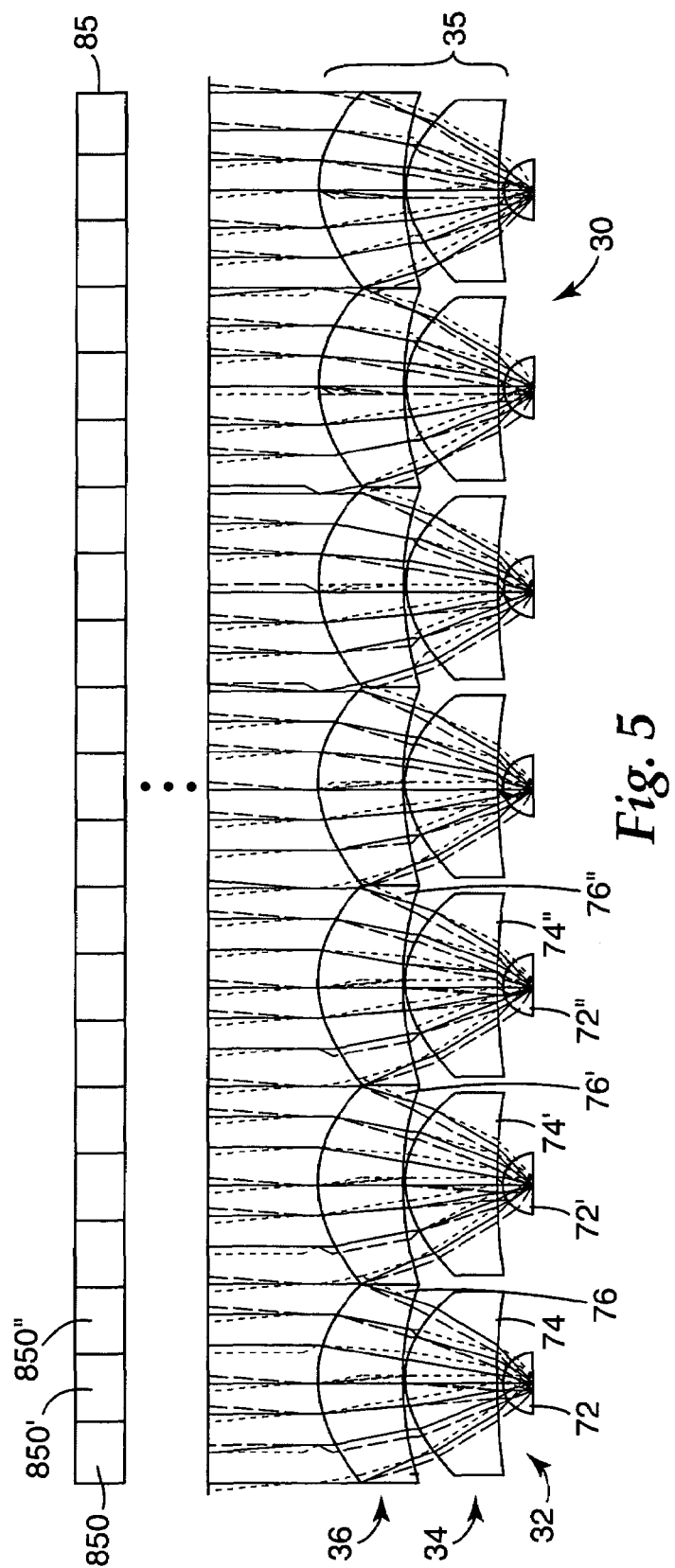
FIG. 5 is a schematic cross-sectional view of an illumination system constructed according to another exemplary embodiment of the present disclosure, which is particularly useful for backlighting applications.

Another exemplary embodiment of the illumination systems of the present disclosure is illustrated in FIG. 5. Such exemplary embodiments may be used for direct backlighting of LCDs or other transmissive displays. In particular, the illumination system 30 shown in FIG. 5 may be used to illuminate an LCD 85. The illumination system 30 includes a set of light source modules 32, such as light source modules 72, 72', 72", which may be LED light source modules, and a system of optical elements 35. In such exemplary embodiments, sufficient amount of light source modules, such as 72, 72', 72", should be used to create an illumination patch that covers a sufficient portion of the surface of the LCD 85, to obtain a resultant image of the desired size, brightness and quality. In such exemplary embodiments, the system of optical elements 35 includes a first set of lenses 34, including lenslets 74, 74', 74", a second set of lenses 36, including lenslets 76, 76', 76", and may optionally include collimating optics such as Fresnel lenses, gradient index lenses, etc. (not shown). It will be understood by those of ordinary skill in the art, that the system of optical elements 35 may include other additional components as may be desired for a particular application.

Referring further to FIG. 5, in the appropriate embodiments, a pair of lenslets, one from the set 34 and one from the set 36, for example, lenslets 74 and 76, may be associated with each light source module, for example, 72. The sets of lenses 34 and 36 may be configured as a double-layered closely packed array, similar to the array shown in FIG. 2B, in which the number and overall structure of the configuration 58 is altered to accommodate the desired number of the light source modules 72, 72', 72", etc. and the shape of the surface to be illuminated, such as the LCD display 85, which is usually rectangular or square. The general shapes and respective positioning of the lenslets in the sets 34 and 36, as well as the general shape and positioning of the light source modules may be substantially the same as those described in reference to the embodiments illustrated in FIGS. 1-3, 4A-4D or may have another suitable configuration.

The system of optical elements 35 may be configured so that it images one or more of the emitting surfaces of the light source modules of the set 32 onto one or more pixels, such as 850, 850', 850", of the LCD 85, which in these exemplary embodiments would constitute the illumination target or targets (see FIG. 1, element 17). In some exemplary embodiments, it is preferable to image the emitting surfaces onto the LCD 85 with at least some amount of overlap of the adjacent images to create a substantially continuous illumination patch. Thus, in such embodiments, images of the emitting surfaces overlap, or at least partially overlap, to compose a substantially uniform pattern from many emitters, wherein the individual elements may have non-uniform shapes. Further, in the exemplary embodiments suitable for direct view backlighting, the images may overlap only partially, just so that they substantially fill the area to be illuminated. Here, substantial superposition of the images is not needed, as would be the case for many projection applications. Alternatively, an individual emitting surface may be imaged onto a discrete pixel or a certain number of pixels. Finally, in the illumination system 30, a tradeoff may be made between the brightness of the light source modules, their size and the number of channels (here, the number of individually controlled sources with the associated optics).

Figure 6:
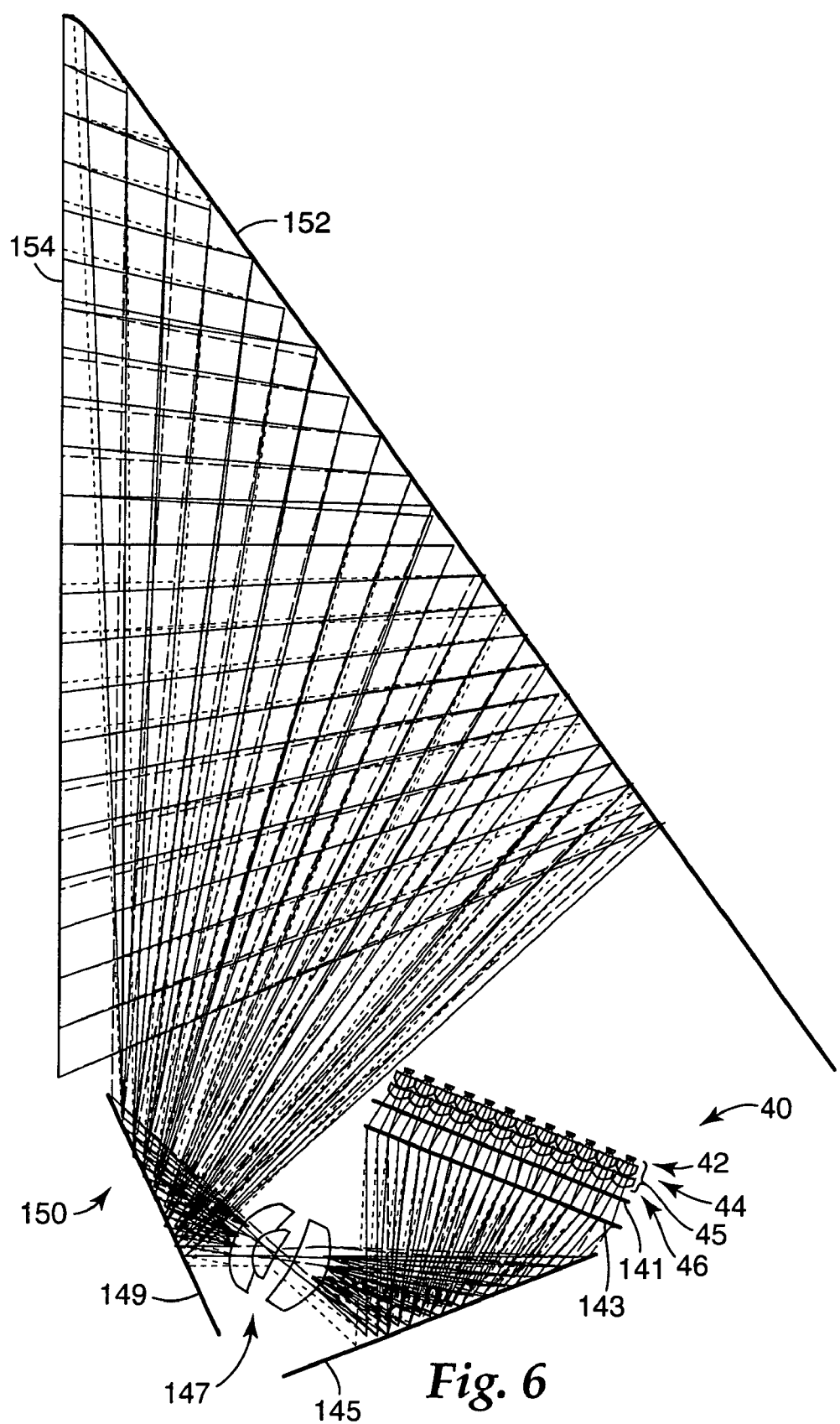
FIG. 6 is a schematic cross-sectional view of an illumination system constructed according to another exemplary embodiment of the present disclosure, which is particularly useful for projection applications.

Another exemplary embodiment of the illumination systems of the present disclosure is illustrated schematically in FIG. 6. Such an illumination system 40 may be used in a projection system 150. The illumination system 40, used to illuminate a projection screen 154, includes a set of light source modules 42, such as light source modules 72, 72', 72" (as in FIGS. 1-5), and a system of optical elements 45. In the exemplary embodiments illustrated in FIG. 6, the system of optical elements 45 includes a first set of lenses 44, having lenslets similar to those shown and described in reference to FIGS. 1-5, and a second set of lenses 46, also having lenslets similar to those shown and described in reference to FIGS. 1-5. The illumination system 40 may be followed by an imaging device 141, such as an LCD transmissive device, and by a field lens 143, such as a Fresnel lens. Folding mirrors 145, 149 and 152, which may be ordinary front-surface mirrors, may be used for folding the optical path of the projection system 150 and thus increasing its compactness. The projection system may further include projection optics 147 for projecting the image created by the imaging device 141 onto the screen 154.

Referring further to FIG. 6, a pair of lenslets, one from the set 44 and one from the set 46, for example, lenslets 74 and 76 shown in FIG. 3, may be associated with each light source module, for example, 72, also shown in FIG. 3. The sets of lenses 44 and 46 may be configured as a double-layered closely packed array, similar to the array shown in FIG. 2B, in which the number and overall structure of the configuration 58 may be altered to achieve the desired brightness, resolution and size of the resultant image formed on the screen 154. Preferably, the general shapes and sizes of the lenslets of the sets 44 and 46, as well as the general shape and size of the light source modules of the set 42, are substantially the same as those described in reference to the embodiments illustrated in FIGS. 1-5. Exemplary embodiments illustrated in FIG. 6 are particularly useful for large LCD panel projection applications, because they allow decreasing the size of the cabinet and using fewer components.

Figure 7:
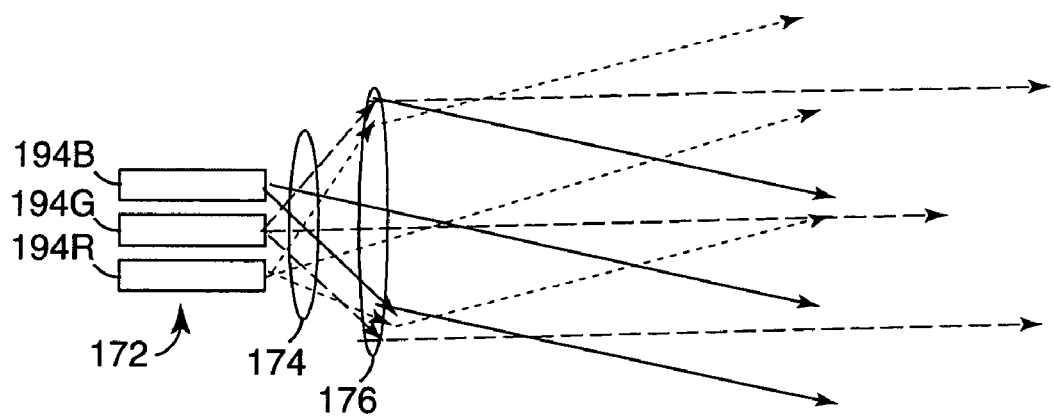
FIG. 7 is a schematic representation of a portion of an exemplary embodiment of the present disclosure, illustrating the use of light source modules having emitting surfaces of different colors.

In accordance with another aspect of the present disclosure, FIG. 7 illustrates a light source module having emitting surfaces of multiple colors. For example, in FIG. 7, the light source module 172 includes three emitting surfaces 194R, 194G and 194B (red, green and blue, respectively, or other suitable primary colors), placed next to each other. Such light emitting modules may be three-chip LED modules, and any one or more of the emitting surfaces may be or may include LED emitting surfaces, phosphor layers, or any other emissive materials. Collimator optics 174 and 176 may include lenslets similar to those shown and described in reference to the embodiments illustrated in FIGS. 1-6 or any other suitable optical elements. Preferably, each lenslet receives light from all three emitting surfaces 194R, 194G and 194B. Thus, the cost and size of illumination systems may be decreased, because multiple light sources share the same optics. To accomplish this, the emitting surfaces 194R, 194G and 194B are typically disposed sufficiently close together. In addition, the emitting surfaces should be disposed sufficiently close to the lenslets to ensure efficient collection of light.

The light source module 172 and the collimating optics 174, 176 are configured so that collimation is achieved for the emitting surfaces 194R, 194G and 194B in such a way that the illumination is "indexed" with respect to a particular color. This may be accomplished by placing the emitting surfaces 194R, 194G and 194B near the focal plane of the collimating optics, so that spatial separation of the different color emitters is transformed into angular separation of the beams having different colors. For example, for an arrangement shown in FIG. 7, green light may exit the collimating optics at about 0 degrees to the optical axis, while red light may exit the collimating optics at about +2 degree angle to the optical axis, and blue light may exit at about −2 degree angle.

Figure 8:
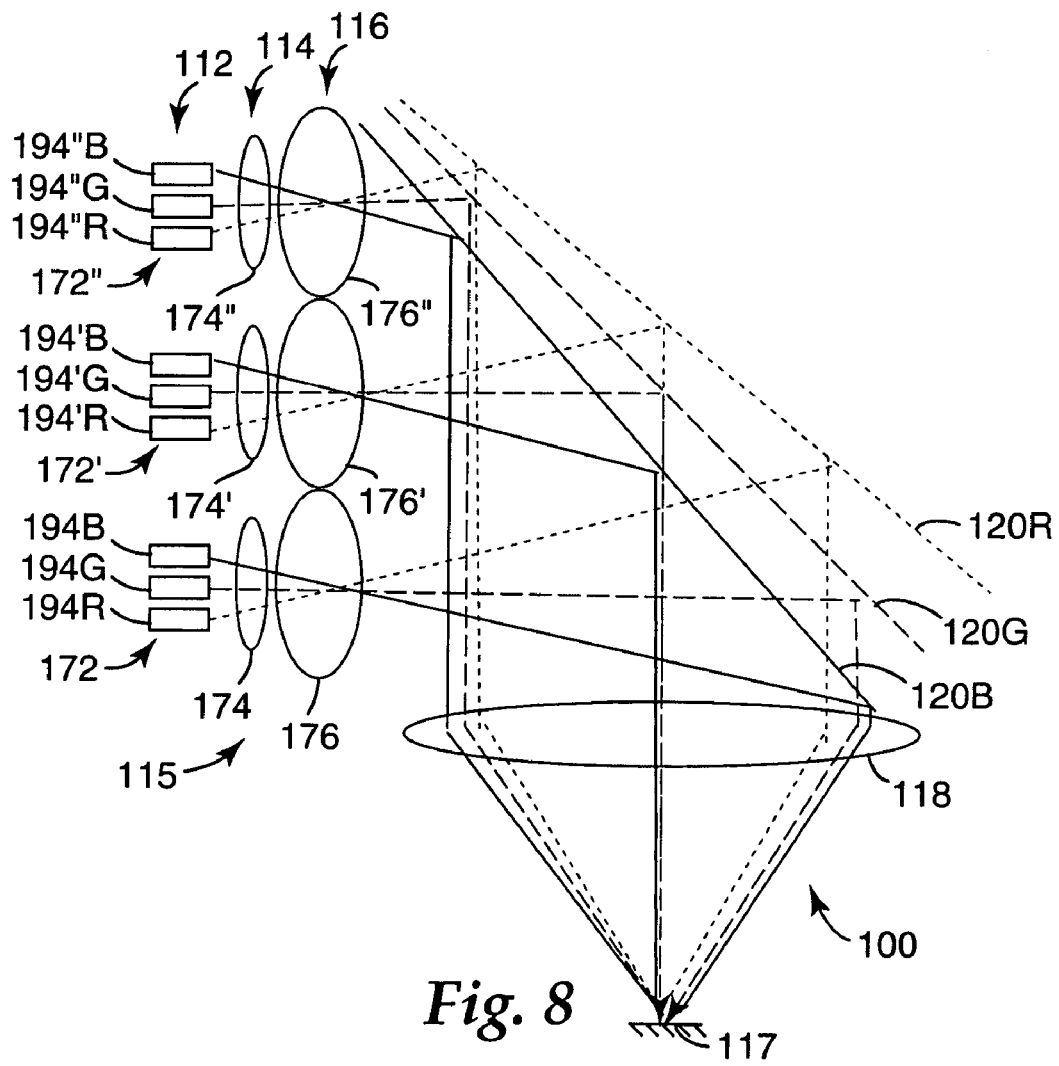
FIG. 8 is a schematic cross-sectional view of an illumination system constructed according to an exemplary embodiment of the present disclosure utilizing light source modules having emitting surfaces of different colors.

FIG. 8 schematically shows another exemplary embodiment of the illumination systems of the present disclosure. The illumination system 100 shown in FIG. 8 includes a set of light source modules 112, such as light source modules 172, 172' and 172", each having multiple emitting surfaces 194R, 194G, 194B, 194R', 194G', 194B' and 194R", 194G", 194B" respectively, and a system of optical elements 115. In the exemplary embodiments illustrated in FIG. 8, the system of optical elements 115 includes a first set of lenses 114, including lenslets 174, 174', 174", a second set of lenses 116, including lenslets 176, 176', 176", dichroic mirrors 120R, 120B and 120G and a condenser 118. The condenser 118 may be or may include a plano-convex lens, preferably having an aspheric convex surface, a meniscus lens, or a gradient-index lens. The system of optical elements 115 may include other components in addition to or in place of the elements shown, as may be desired for a particular application In the appropriate embodiments of the present disclosure, the set of lenses 114 including lenslets 174, 174', 174" and the set of lenses 116 including lenslets 176, 176', 176" may have configurations similar to the sets of lenses described in reference to other exemplary embodiments of the present disclosure, or they may have other suitable configurations, as appropriate for a particular application. For example, a pair of lenslets, one from the set 114 and one from the set 116 may be associated with each light source module. For example, in FIG. 8, lenslets 174 and 176 are associated with the light source module 172, lenslets 174' and 176' are associated with the light source module 172", and lenslets 174" and 176" are associated with the light source module 172". As it was explained in connection with FIG. 7, any or all of the emitting surfaces 194R, 194G, 194B, 194R', 194G', 194B' and 194R", 194G", 194B" may be emitting surfaces of red, green and blue (RGB) LED modules, layers of phosphor, any other emissive material or any number or a combination thereof.

Referring further to FIG. 8, the system of optical elements 115 may be configured to image one or more of the emitting surfaces of the light source modules, for example, 172, 172', 172", onto an illumination target 117. As it has been explained in reference to other exemplary embodiments, the nature of the illumination target 117 will vary depending on the specific application. For example, the illumination target 117 may be an entrance to a light tunnel, an imaging device, an LCD, or a specific color zone or pixel of an LCD. Where superimposed or at least partially overlapping color illumination patches are desired, dichroic mirrors 120R, 120B and 120G may be used to combine the images of emitting surfaces of different colors on the illumination target 117.

Similar to other exemplary embodiments described herein, one or more of the emitting surfaces 194R, 194G, 194B, 194R', 194G', 194B', 194R", 194G", 194B", etc. of the light source modules 172, 172', 172", etc. may be given a specific shape to improve performance of the illumination system 100. For example, one or more of the emitting surfaces may be shaped to match substantially the general shape of the illumination target 117. In particular, if the target 117 is a square entrance of a light tunnel, one or more of the emitting surfaces of the light source modules, such as 172, 172', 172", also may be generally shaped as squares. If, on the other hand, the target 117 is a rectangular image-forming device or a rectangular color zone or pixel of an LCD, one or more of the emitting surfaces of the light source modules also may be generally shaped as rectangles. It will be readily understood by those of ordinary skill in the art that other shapes of the emitting surfaces and of the illumination targets are within the scope of the present disclosure.

Figure 9:
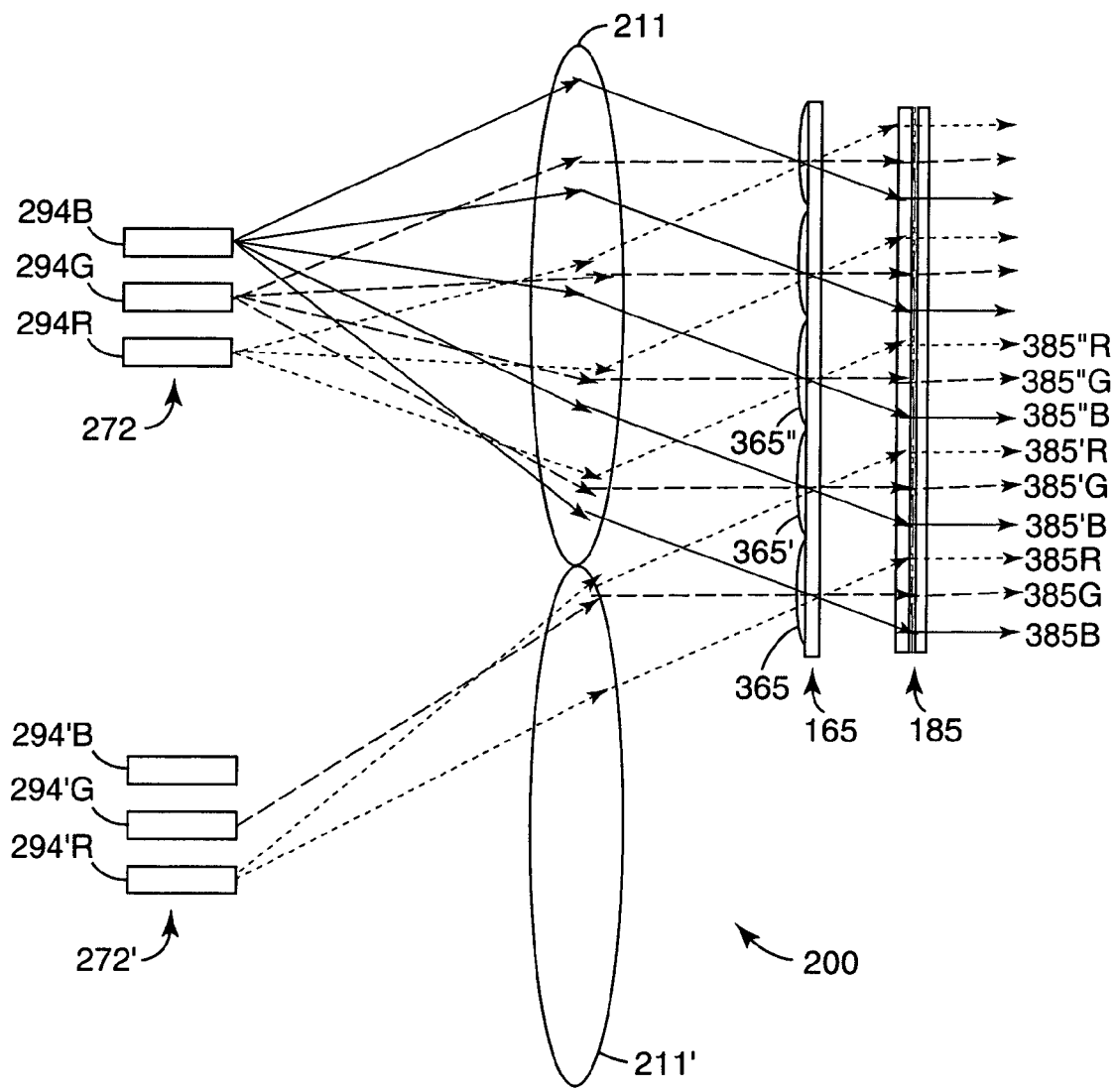
FIG. 9 is a schematic cross-sectional view of an illumination system constructed according to another exemplary embodiment of the present disclosure utilizing light source modules having emitting surfaces of different colors.
Figure 9:
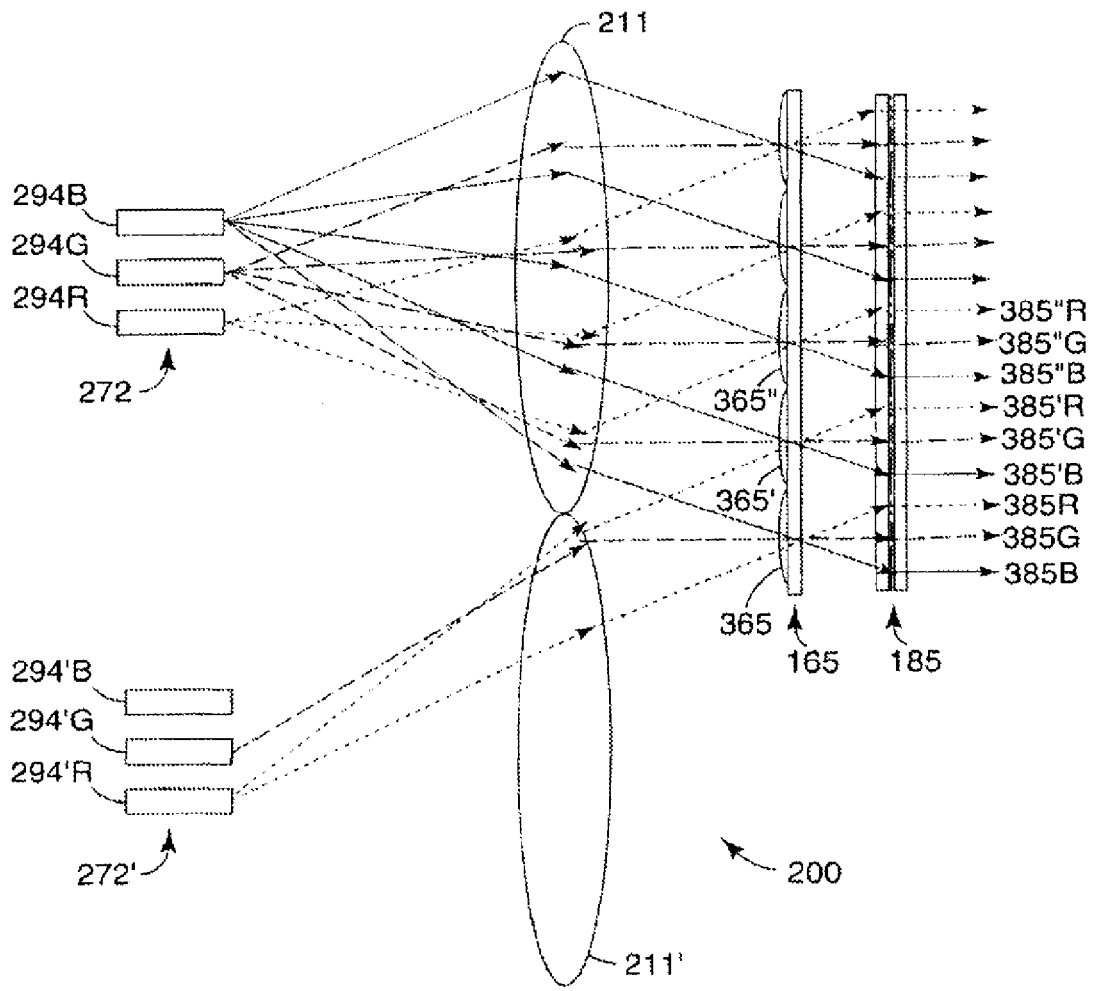

Another exemplary embodiment of the illumination systems of the present disclosure is illustrated in FIG. 9. Such exemplary embodiments may be used for backlighting LCDs or other transmissive displays. The illumination system 200 includes one or more light source modules, exemplified by the light source modules 272 and 272', which may be three-chip LED modules, and a system of optical elements, such as a set of collimating lenses, exemplified by 211 and 211', in which each of the collimating lenses is associated with at least one of the light source modules. The illumination system 200 may be used to illuminate an imaging device 185. In such exemplary embodiments, sufficient amount of light source modules, exemplified by 272 and 272', having emitting surfaces of different colors, exemplified by 294R, 294G, 294B and 294'R, 294'G, 294'B, should be used to cover a sufficient portion of the surface of the imaging device 185, which may be an LCD display, to obtain a resultant image of the desired size and quality. The imaging device may have an array of color zones or pixels, exemplified by the pixels 385R, 385G, 385B, 385'R, 385'G, 385'B and 385"R, 385"G, 385"B.

A lenticular array 165, including individual lenticules, such as 365, 365', 365", which may be disposed proximate to the imaging device 185, may be used to image one or more of the emitting surfaces, such as 294R, 294G, 294B, 294'R, 294'G, 294'B, onto a corresponding color zone or pixel, such as 385R, 385G, 385B, 385'R, 385'G, 385'B, 385"R, 385"G and 385"B. The lenticules may be biconvex or plano-convex lenses. In some exemplary embodiments, one or more of the emitting surfaces may be imaged onto a filter stripe. In that case, each individual lenticule focuses the beams corresponding to different colors originating from different emitters to different places on the imaging device 185, for example, onto different color zones or pixels. In particular, the lenticule 365" may focus the beams corresponding to red, green and blue light originating from the emitting surfaces 294R, 294G and 294B onto the color zones or pixels 385R", 385G" and 385B" of the imaging device 185. Further, as it has been explained in connection with other exemplary embodiments, the shapes of the emitting surfaces may be matched to the shape of the color zones or pixels. Thus, each light source module may illuminate a predetermined area of the imaging device, containing many color zones or pixels, so that its effective surface is substantially lit. Uniformity is achieved by calibrating all the light emitting modules and their constituent multi-color emitters to the proper output level.

Referring further to FIG. 9, in some exemplary embodiments, the lenticular array 165 as well as the pixels or color zones, such as 385R, 385G, 385B, 385'R, 385'G, 385'B, 385"R, 385"G, 385"B, have a pitch of about 0.2 mm. Light-emitting surfaces, such as 294B, 294G, 294R, can be emissive stripes, for example LED stripes, with about 0.4 mm center-to-center spacing. The collimating lenses, such as 211 and 211', can be carefully spliced together to create a uniform illumination beam, so that the imaging device 185 is lit substantially without interruption. Alternatively, for example, the spacing between light-emitting surfaces can be about 0.6#mm, with the pitch between the lenticules of about 0.3#mm and about 0.1#mm between color zones or pixels of the imaging device 185. The collimating lenses, such as 211, 211', and the associated light source modules, such as 272 and 272', may be hexagonally packed or packed into Cartesian grid or provided in another arrangement, as desired for a specific application.

With further reference to FIG. 9, the illumination system 200 yields beams that are angularly separated depending on their color. As a result, red light may be channeled through the red color zone or zones of an imaging device, and likewise blue and green light may be channeled through the blue and green color zones, respectively. Filters may or may not be used with such embodiments of the present disclosure, depending on the purity of channeling. Pure channeling, or channeling that is substantially free from crosstalk, may be achieved with some embodiments of the present disclosure, since specific color will be delivered to a specific pixel, for example, only red light passing through a red color zone. Further, the present disclosure allows utilization of light source modules, such as LED modules, for best far-field distribution of illumination.

The approach of the present disclosure simplifies designing illumination systems for a variety of specific applications and allows for many different configurations of light source modules, optics and imaging devices. Exemplary embodiments of the present disclosure are capable of collecting light from lambertian-type emitters, such as LEDs, more effectively than traditional systems. Thus, more light may be transmitted to the illumination target resulting in better overall efficiency. In addition, exemplary embodiments of the present disclosure may have better imaging characteristics. Furthermore, the present disclosure allows the creation of illumination systems that use fewer components, are compact, are versatile, and are easier and less expensive to manufacture.

Although the illumination systems of the present disclosure have been described with reference to specific exemplary embodiments, those of ordinary skill in the art will readily appreciate that changes and modifications may be made thereto without departing from the spirit and scope of the present invention. For example, dimensions and configurations of the systems of optical elements that are used in various embodiments of the present disclosure can vary depending on the specific application and the nature and dimensions of the illumination target. In addition, the exemplary embodiments of the present disclosure may incorporate optical elements, components and systems described in U.S. Application entitled "Light-Collecting Illumination System", Attorney Docket No. 59516US002, and U.S. Application entitled "Reshaping Light Source Modules and Illumination Systems Using the Same," Attorney Docket No. 59526US002, filed concurrently herewith, the disclosures of which are hereby incorporated by reference herein to the extent they are not inconsistent with the present disclosure. Further, the present disclosure contemplates inclusion of additional optical elements into exemplary embodiments of the illumination systems constructed in accordance with the present disclosure, as would be known to those of ordinary skill in the art.

Further, those of ordinary skill in the art will readily appreciate that embodiments of the present disclosure may be used with a variety of light sources, including white LEDs, color LEDs (e.g., red, blue, green or other colors) and multi-chip LED modules, e.g., RGB LED modules. RGB LEDs typically will allow achieving the best color performance, but white LEDs are acceptable for many applications.

What is claimed is:

1. The illumination system:
   a plurality of light source modules disposed in an array within a non-radially symmetrical aperture, each light source module comprising a light-emitting surface;
   a light tunnel having an entrance; and
   a system of optical elements disposed between the plurality of light source modules and the light tunnel;
   wherein the system of optical elements images the emitting surfaces of the light source modules onto the entrance of the light tunnel.

2. The illumination system as recited in claim 1, wherein images of the emitting surfaces are substantially superimposed to form an illumination patch, said illumination patch substantially filling the entrance of the light tunnel.

3. The illumination system as recited in claim 2, wherein a shape of at least one of the emitting surfaces substantially matches, a shape of the entrance of the light tunnel.

4. The illumination system as recited in claim 3, wherein the shape of the entrance of the light tunnel is substantially square.

5. The illumination system as recited in claim 3, wherein the shape of the entrance of the light tunnel is substantially rectangular.

6. The illumination system as recited in claim 2, wherein a shape of at least one of the emitting surfaces is substantially square, a shape of the entrance of the light tunnel is substantially rectangular, and the system of optical elements is configured so that a shape of the illumination patch substantially matches the shape of the entrance of the light tunnel.

7. The illumination system as recited in claim 1, wherein images of the emitting surfaces are closely packed thus forming an illumination patch, said illumination patch substantially filling the entrance of the light tunnel.

8. The illumination system as recited in claim 1, wherein images of the emitting surfaces overlap thus forming an illumination patch, said illumination patch substantially filling the entrance of the light tunnel.

9. The illumination system as recited in claim 1, wherein the light source modules and the system of optical elements are configured to form plurality of channels aimed substantially into the entrance of the light tunnel.

10. The illumination system as recited in claim 9, wherein the light source modules are disposed tangentially to and along a spherical surface.

11. The illumination system as recited in claim 9, wherein the light source modules are disposed substantially coplanar with each other and the system of optical elements comprises means for aiming at least some light from each light source module substantially toward the entrance of the light tunnel.

12. The illumination system as recited in claim 1, wherein each light source module comprises a plurality of emitting surfaces of different colors disposed next to each other.

13. The illumination system as recited in claim 12, wherein each light source module comprises a first light-emitting surface of a first color, a second light-emitting surface of a second color and a third light-emitting surface of a third color.

14. The illumination system as recited in claim 13, wherein the system of optical elements comprises dichroic mirrors.

15. The illumination system as recited in claim 13, wherein the first, second and third colors are primary colors.

16. An illumination system, comprising:
   a plurality of light source modules disposed in an array within a non-radially symmetrical aperture;
   an illumination target; and
   a system of optical elements disposed between the plurality of light source modules and the illumination target,
   wherein the illumination target is an image-forming device having a plurality of mirrors rotatable about a pivot axis, and wherein the non-radially symmetrical aperture has a long dimension and a short dimension and is oriented so that the long dimension is aligned with the pivot axis of the mirrors of the image-forming device.

17. An illumination system, comprising:
- a plurality of light source modules disposed in an array within a non-radially symmetrical aperture, each light source module comprising a light-emitting surface;
- an image-forming device; and
- a system of optical elements disposed between the plurality of light source modules and the image-forming device;
- wherein the system of optical elements images the emitting surfaces of the light source modules onto the image-forming device.

18. The illumination system as recited in claim 17, wherein images of the emitting surfaces are substantially superimposed to form an illumination patch, said illumination patch substantially filling the image-forming device.

19. The illumination system as recited in claim 18, wherein the illumination patch overfills the image-forming device.

20. The illumination system as recited in claim 17, wherein a shape of at least one of the emitting surfaces substantially matches a shape of the image-forming device.

21. The illumination system as recited in claim 20, wherein the shape of the image-forming device is substantially square.

22. The illumination system as recited in claim 20, wherein the shape of the image-forming device is substantially rectangular.

23. The illumination system as recited in claim 17, wherein a shape of at least one of the emitting surfaces is substantially square, a shape of the image-forming device is substantially rectangular, and the system of optical elements is configured so that a shape of the illumination patch substantially matches the shape of the image-forming device.

24. The illumination system as recited in claim 17, wherein images of the emitting surfaces are closely packed thus forming an illumination patch, said illumination patch substantially filling the image-forming device.

25. The illumination system as recited in claim 17, wherein images of the emitting surfaces overlap thus forming an illumination patch, said illumination patch substantially filling the image-forming device.

26. The illumination system as recited in claim 17, wherein the image forming device is an LCD comprising a plurality of pixels.

27. The illumination system as recited in claim 17, wherein the light source modules and the system of optical elements are configured to form a plurality of channels aimed substantially into the image-forming device.

28. The illumination system as recited in claim 27, wherein the light source modules are disposed tangentially to and along a spherical surface.

29. The illumination system as recited in claim 27, wherein the light source modules are disposed substantially coplanar with each other and the system of optical elements comprises means for aiming at least some light from each light source module substantially toward the image-forming device.

30. The illumination system as recited in claim 17, wherein each light source module comprises a plurality of emitting surfaces of different colors disposed next to each other.

31. The illumination system as recited in claim 17, wherein each light source module comprises a first light-emitting surface of a first color, a second light-emitting surface of a second color and a third light-emitting surface of a third color.

32. The illumination system as recited in claim 31, wherein the image forming device comprises first, second and third color zones, and wherein the system of optical elements images the first emitting surface onto the first color zone, the second emitting surface onto the second color zone, and the thud emitting surface onto the third color zone.

33. The illumination system as recited in claim 31, wherein the first, second and third colors are primary colors.

34. The illumination system as recited in claim 17, wherein the system of optical elements comprises dichroic mirrors.

35. The illumination system as recited in claim 17, wherein the system of optical elements comprises a lenticular array disposed between the plurality of light source modules and the image forming device.

36. An illumination system comprising:
- a plurality of light source modules disposed in an array within a non-radially symmetrical aperture, each light source module comprising a light-emitting surface;
- a light tunnel having an entrance; and
- a system of optical elements disposed between the plurality of light source modules and the light tunnel,
- wherein the system of optical elements images the emitting surfaces of the light source modules onto the entrance of the light tunnel, and the system decreases etendue degradation.

37. The illumination system as recited, in claim 36, wherein images of the emitting surfaces are substantially superimposed to form an illumination patch, said illumination patch substantially filling the entrance of the light tunnel.

38. The illumination system as recited in claim 36, wherein a shape of at least one of the emitting surfaces substantially matches a shape of the entrance of the light tunnel.

39. The illumination system as recited in claim 36, wherein images of the emitting surfaces are closely packed thus forming an illumination patch, said illumination patch substantially filling the entrance of the light tunnel.

40. The illumination system as recited in claim 36, wherein images of the emitting surfaces overlap thus forming an illumination patch, said illumination patch substantially filling the entrance of the light tunnel.

41. The illumination system as recited in claim 36, wherein the light source modules and the system of optical elements are configured to form a plurality of channels aimed substantially into the entrance of the light tunnel.

42. The illumination system as recited in claim 36, wherein each light source module comprises a plurality of emitting surfaces of different colors disposed next to each other.

* * * * *

UNITED STATES PATENT AND TRADEMARK OFFICE
CERTIFICATE OF CORRECTION

PATENT NO. : 7,300,177 B2
APPLICATION NO. : 10/776152
DATED : November 27, 2007
INVENTOR(S) : Arlie R. Conner It is certified that error appears in the above-identified patent and that said Letters Patent is hereby corrected as shown below:

Delete drawing sheet 8 of 8, and substitute therefor the attached drawing sheet 8 of 8.

Figure 10:
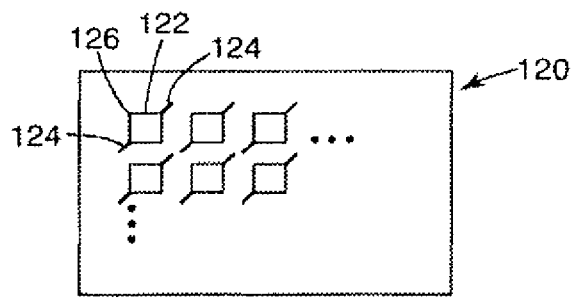

Column 4
Line 38, After "colors." add the following paragraph
-- ; and
Figure 10 is a schematic plan view of the surface of a DMD type light valve showing the orientation of the hinges of the individual pixels. --.

Column 5
Line 67, After "contrast." add the following paragraph
-- Fig. 10 illustrates a light valve 120 in the form of a deformable mirror device (hereinafter referred to as "DMD") having an array of reflective pixels 122. Each pixel 122 is mounted so as to be pivotable about torsion hinges 124 which are located at two diagonal corners of each pixel 122, thus defining a pivot axis. In operation when an appropriate ON voltage is applied to pixel 122, the upper lefthand corner 126 of pixel 122 will move upwardly from the plane of the DMD 120 while the lower righthand corner 128 will move downwardly. Similarly, when an OFF voltage is applied, pixel 122 will pivot about torsion hinges 124 so that corner 126 moves downwardly and corner 128 moves upwardly. Thus the ON and OFF positions comprise two distinct movements of each pixel 122. Generally, pixels 122 can be pivoted by 10 degrees to either side of planar. In the ON position, the incident illumination is reflected into the aperture of a projection lens. In the OFF position, the incident illumination is reflected outside the aperture of the projection lens and thus does not reach the viewing screen. --.

Column 13
Line 8, After "cation" insert -- . --.

Column 14
Line 55, Delete "Cartesian" and insert -- cartesian --, therefor.

Column 16
Line 3, In Claim 3, after "matches" delete ",".
Line 28, In Claim 9, after "form" insert -- a --.

UNITED STATES PATENT AND TRADEMARK OFFICE
CERTIFICATE OF CORRECTION

PATENT NO.        : 7,300,177 B2
APPLICATION NO.   : 10/776152
DATED             : November 27, 2007
INVENTOR(S)       : Arlie R. Conner It is certified that error appears in the above-identified patent and that said Letters Patent is hereby corrected as shown below:

<u>Column 18</u>
Line 12, In Claim 32, delete "thud" and insert -- third --, therefor.
Line 35, In Claim 37, after "recited" delete ",".

Signed and Sealed this

Fourteenth Day of April, 2009

JOHN DOLL
*Acting Director of the United States Patent and Trademark Office*